(12) United States Patent
Jang et al.

(10) Patent No.: US 9,935,529 B2
(45) Date of Patent: Apr. 3, 2018

(54) METHOD FOR MANUFACTURING LAMINATED CORE FOR MOTOR

(71) Applicant: NEW MOTECH CO., LTD., Gwangju (KR)

(72) Inventors: Jeong Cheol Jang, Gwangju (KR); Kyoung Joo Lee, Gwangju (KR); Hyun Sung Yang, Gwangju (KR)

(73) Assignee: NEW MOTECH CO., LTD., Gwangju (KR)

(*) Notice: Subject to any disclaimer, the term of this patent is extended or adjusted under 35 U.S.C. 154(b) by 0 days.

(21) Appl. No.: 15/342,120

(22) Filed: Nov. 3, 2016

(65) Prior Publication Data

US 2017/0077789 A1 Mar. 16, 2017

Related U.S. Application Data

(62) Division of application No. 14/622,936, filed on Feb. 16, 2015, now Pat. No. 9,705,386.

(30) Foreign Application Priority Data

May 16, 2014 (KR) ........................ 10-2014-0058804

(51) Int. Cl.
*H02K 15/02* (2006.01)
*H02K 1/14* (2006.01)
*H02K 1/18* (2006.01)

(52) U.S. Cl.
CPC ........... *H02K 15/022* (2013.01); *H02K 1/148* (2013.01); *H02K 1/185* (2013.01); *H02K 15/02* (2013.01); *H02K 2201/09* (2013.01); *Y10T 29/49009* (2015.01); *Y10T 29/49011* (2015.01); *Y10T 29/49012* (2015.01); *Y10T 29/49075* (2015.01); *Y10T 29/49078* (2015.01)

(58) Field of Classification Search
CPC ...... H02K 15/02; H02K 15/022; H02K 1/148; H02K 1/185; H02K 2201/09; Y10T 29/49009; Y10T 29/49011; Y10T 29/49012; Y10T 29/49075; Y10T 29/49078

See application file for complete search history.

(56) References Cited

U.S. PATENT DOCUMENTS

| | | | |
|---|---|---|---|
| 2003/0066183 A1* | 4/2003 | Nouzumi | H02K 15/022 29/596 |
| 2009/0121577 A1 | 5/2009 | Tatematsu et al. | |
| 2011/0154650 A1* | 6/2011 | Hashimoto | H02K 15/022 29/598 |

(Continued)

FOREIGN PATENT DOCUMENTS

| | | |
|---|---|---|
| JP | 06-086487 A | 3/1994 |
| JP | 39-308143 A | 11/1997 |
| JP | 2003-047181 A | 2/2003 |

(Continued)

*Primary Examiner* — A. Dexter Tugbang
(74) *Attorney, Agent, or Firm* — Revolution IP, PLLC (57) ABSTRACT

A method for manufacturing a laminated core for a motor comprises the steps of: stamping a sheet of a core of a straight form to have a form that a plurality of split cores are connected; laminating sheets of the core perpendicularly; bending the sheets of the core in a round form; and forming a connection caulking part at contact parts of yokes, which are adjacent to each other, of the bended core.

1 Claim, 7 Drawing Sheets

(56) References Cited

U.S. PATENT DOCUMENTS

2012/0169173 A1    7/2012  Jang et al.

FOREIGN PATENT DOCUMENTS

| JP | 2007-074875 A | 3/2007 |
| JP | 2010-130824 A | 6/2010 |
| KR | 10-0517939 B1 | 9/2005 |
| KR | 10-0969699 B1 | 4/2007 |
| KR | 10-1070987 B1 | 9/2011 |

* cited by examiner

METHOD FOR MANUFACTURING LAMINATED CORE FOR MOTOR

CROSS REFERENCE TO PRIOR APPLICATIONS

This application is a Divisional Application of U.S. patent application Ser. No. 14/622,936 filed on Feb. 16, 2015, which claims priority to Korean Patent Application 10-2014-0058804 filed on May 16, 2014, which are all hereby incorporated by reference in their entirety.

BACKGROUND

The present invention relates to a core of a motor. More particularly, the present invention relates to a laminated core for a motor which can maintain squareness of the laminated core and increase a binding force of each core, thereby maximizing efficiency of the motor.

In general, a motor includes a rotor and a stator. The rotor or the stator uses a core made of a conductive metallic material in order to form a necessary magnetic field. Moreover, laminated cores manufactured by laminating of a plurality of thin steel sheets.

Such a laminated core can show good performance of the motor when each sheet of the core must be laminated while accurately keeping verticality and firmly combined with another sheet of the core. In detail, if the core is laminated without maintaining verticality, namely, if squareness is not maintained, because an air gap which is a space between the rotor and the stator is not uniform, the rotor shows uneven rotation and is deteriorated in efficiency.

There are various attempts to combine the sheets of the core. In Japanese Patent Laid-open No. 06-086487, sheets of a core are combined by being welded perpendicularly in a state where each sheet of the core is stacked on another. In another way, Japanese Patent Laid-open No. 2010-130824 discloses a method for combining sheets of a core by caulking to pressurize stacked a predetermined position of the stacked sheets of the core by press die.

In a case of laser welding, squareness must be first secured, and then, laser welding is applied. However, caulking is carried out whenever each sheet of the core is stacked, and hence, caulking is widely used because it is effective in keeping squareness. However, the caulking according to prior arts has a disadvantage in that it does not secure bonding force at connected parts of split cores. There is a method to additionally weld only the connected parts of the split cores or to use a bonding member to the connected parts, but it increases manufacturing expenses because of additional process.

Therefore, the inventors of the present invention propose a laminated core for a motor with a new structure and a method for manufacturing the same.

SUMMARY

Accordingly, the present invention has been made to solve the above-mentioned problems occurring in the prior arts, and it is an object of the present invention to provide a laminated core for a motor and a method for manufacturing the same which can secure a combining force between sheets of a core and a combining force between split cores adjacent to each other.

It is another object of the present invention to provide a laminated core for a motor and a method for manufacturing the same which can secure squareness of the laminated core so as to enhance performance of the motor.

The above and other objects of the present invention will be apparent from the following detailed description of the preferred embodiments of the invention To accomplish the above object, according to the present invention, there is provided a laminated core for a motor manufactured by laminating sheets of a plurality of cores, wherein the laminated core is formed by connection of a plurality of split cores, yoke parts of the split cores which are adjacent to each other get in contact with each other so as to form a contact part, and a connection caulking part is formed at the contact part.

In the present invention, preferably, the contact part has a contact protrusion formed on one side and a contact groove formed on the other side.

In the present invention, preferably, the connection caulking part crosses the contact protrusion and the contact groove.

In the present invention, preferably, the yoke has teeth, and each of the teeth has a straight line form on the end flat surface.

In another aspect of the present invention, provided is a method for manufacturing a laminated core for a motor comprising the steps of: stamping a sheet of a core of a straight form to have a form that a plurality of split cores are connected; laminating sheets of the core perpendicularly; bending the sheets of the core in a round form; and forming a connection caulking part at contact parts of yokes, which are adjacent to each other, of the bended core.

The laminated core for the motor and the method for manufacturing the same according to the present invention can secure a combining force between sheets of a core and a combining force between split cores adjacent to each other, and secure squareness of the laminated core so as to enhance performance of the motor.

DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Reference will be now made in detail to the preferred embodiments of the present invention with reference to the attached drawings.

Figure 1:
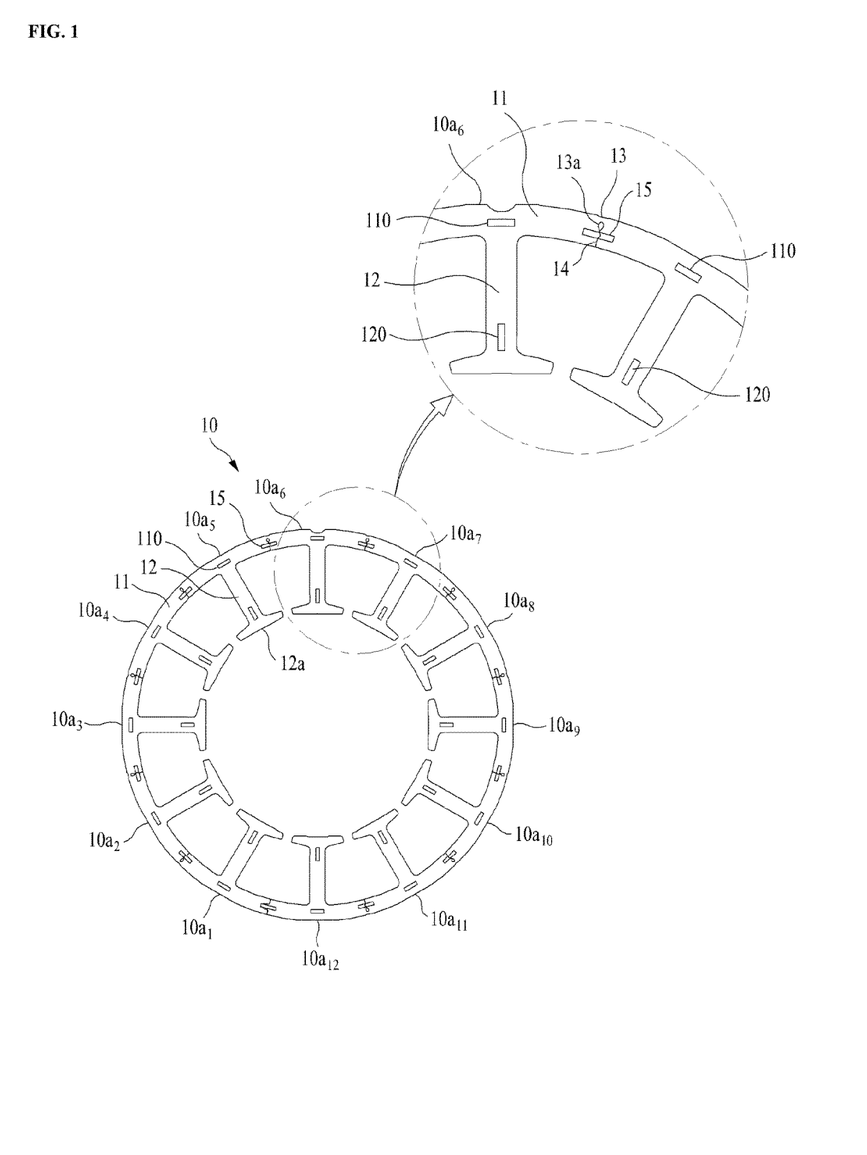
FIG. 1 is a plan view of a laminated core for a motor according to a preferred embodiment of the present invention.

FIG. 1 is a plan view of a laminated core 10 for a motor according to a preferred embodiment of the present invention.

As shown in FIG. 1, the laminated core 10 for the motor according to the preferred embodiment of the present invention is formed by connecting 12 split cores $10_{a1}$, $10_{a2}$, $10_{a3}$, . . . and $10_{a12}$ each of which is formed by laminating a plurality of thin metal sheets. Of course, in FIG. 1, 12 split cores form one laminated core 10, but the number (n) of the split cores ($10_{an}$) is not limited to the above, and at least two split cores can be applied according to sizes of motors or as occasion demands. Moreover, the laminated core 10 for the motor shown in FIG. 1 is a stator core, but the present invention is not limited to the stator core and may be applied to a rotor core of a split core type in the same way.

Each of the split cores $10_{a1}$, $10_{a2}$, $10_{a3}$, . . . and $10_{a12}$ shown in FIG. 1 includes an arc-shaped yoke 11 and teeth 12 formed in the central direction of a circle to form a circle when the split cores $10_{a1}$, $10_{a2}$, $10_{a3}$, . . . and $10_{a12}$ are all connected. In order to increase productivity, preferably, a part where the yokes of two split cores get in contact with each other are connected to each other by a connection part 13. A space part 13a is formed at a portion which is adjacent to the connection part 13 in the central direction of the circle from the connection part 13, and the part where the yokes of two split cores get in contact with each other is called a contact part 14. A connection caulking part 15 is formed at the contact part 14 between the two yokes 11. The connection caulking part 15 firmly connects the adjacent split cores so as to help in that the laminated core maintain the circular form and to increase the bonding force between the sheets of the laminated core. Furthermore, the connection caulking part 15 makes each sheet of the core maintain its accurate position when the sheets of the core are laminated vertically, and hence, is advantageous in securing squareness of the core.

In order to increase the bonding force of the sheets of the laminated core, a caulking part 110 may be formed at a predetermined position, or alternatively, a caulking part 120 may be formed at a predetermined position of the teeth 12. Of course, all of the two caulking parts 110 and 120 may be formed.

A teeth inner diameter side 12a is formed at an end side of the inner diameter of each of the teeth 12. In a case of a general stator core, the teeth inner diameter side 12a has a circular arc form. However, in the present invention, the teeth inner diameter side 12a has not the circular arc form but a straight line form to reduce a cogging torque.

Figure 2:
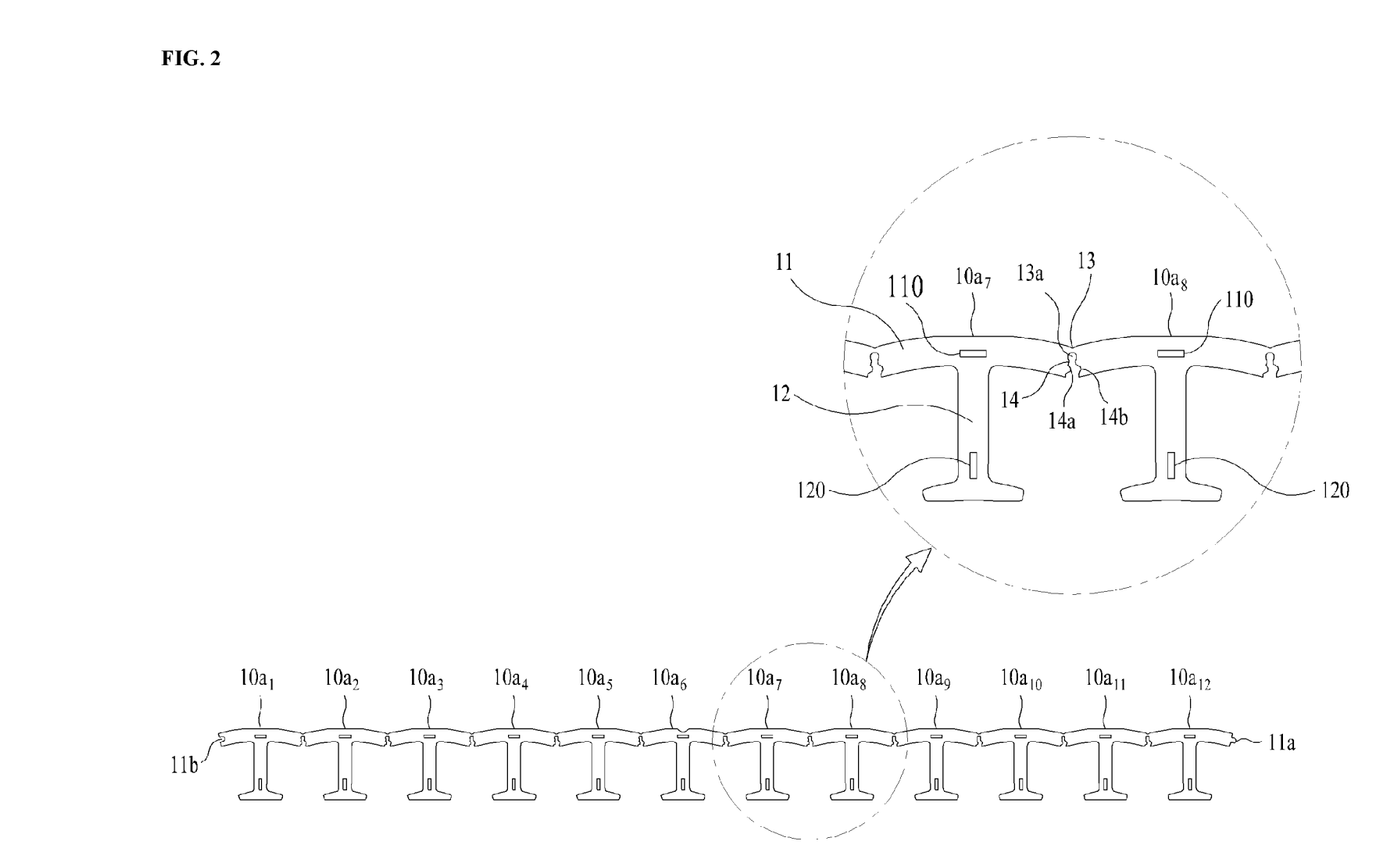
FIG. 2 is a plan view showing a state where the laminated core for the motor is spread in a row.

FIG. 2 is a plan view showing a state where the laminated core for the motor is spread in a row.

Referring to FIG. 2, the 12 split cores $10_{a1}$, $10_{a2}$, $10_{a3}$, . . . and $10_{a12}$ which are spread in a row are connected to one another by the connection part 13. The position of the connection part 13 is located at an outer surface part in the opposite direction from the center of the circle based on the shape of the circular yoke 11. The position is formed at both ends of the yoke of each split core, and is called an ear end in the present invention. That is, ear ends of each of the split cores $10_{a1}$, $10_{a2}$, $10_{a3}$, . . . and $10_{a12}$ are connected by the connection part 13.

The ear end of one side of the first split core $10_{a1}$ has the connection part 13, but the ear end of the other side does not have the connection part. In the same way, the ear end of one side of the last split core $10_{a1}$ has the connection part 13, but the ear end of the other side does not have the connection part. A connection protrusion 11a and a connection groove 11b are formed around the two ear ends which do not have the connection part, such that the connection protrusion 11a and the connection groove 11b are connected with each other when the split cores are bent in a circular form. After the connection protrusion 11a and the connection groove 11b are connected with each other, the connection caulking part 15 is formed at the connected part.

As described above, the space part 13a is formed at the portion which is adjacent to the connection part 13 in the central direction of the circle from the connection part 13. The space part 13a is formed to provide a clearance when the split cores are bent and the connection part 13 is transformed. Additionally, after the split cores are bent, an adhesive is inserted into the space part 13a so as to increase the bonding force between the sheets of the core.

A portion which is adjacent to the space part 13a in the central direction of the circle from the space part 13a is the contact part 14 where the split cores get in contact with each other when they are bent. In order to secure an accurate position of the two contact parts and increase the bonding force, one of the contact parts has a contact protrusion 14a and the other one has a contact groove 14b. When the split cores are bent, the contact protrusion 14a and the contact groove 14b are coupled with each other. When the connection caulking part 15 is formed after bending, preferably, the connection caulking part 15 is formed to cross the contact protrusion 14a and the contact groove 14b which are coupled with each other.

Referring to FIGS. 3 to 7, a method for manufacturing the laminated core for the motor according to the present invention will be described.

Figure 3:
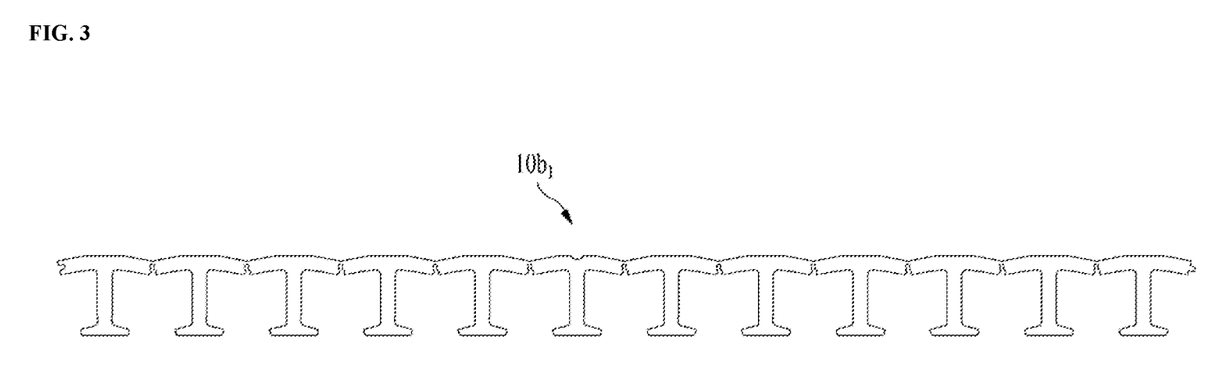
FIG. 3 is a plan view showing one sheet of the core stamped in order to manufacture the laminated core for motor according to the preferred embodiment of the present invention.

FIG. 3 is a plan view showing one sheet $10_{b1}$ of the core stamped in order to manufacture the laminated core for motor according to the preferred embodiment of the present invention.

As shown in FIG. 3, a thin steel sheet is stamped using a press device so as to form a sheet $10_{b1}$ of a core like a form that a plurality of split cores are connected in a row. The sheets of the core are laminated perpendicularly to manufacture a laminated core, and in this instance, the number of the sheets of the core is m, and the number of the sheets of the core is not limited.

Figure 4:
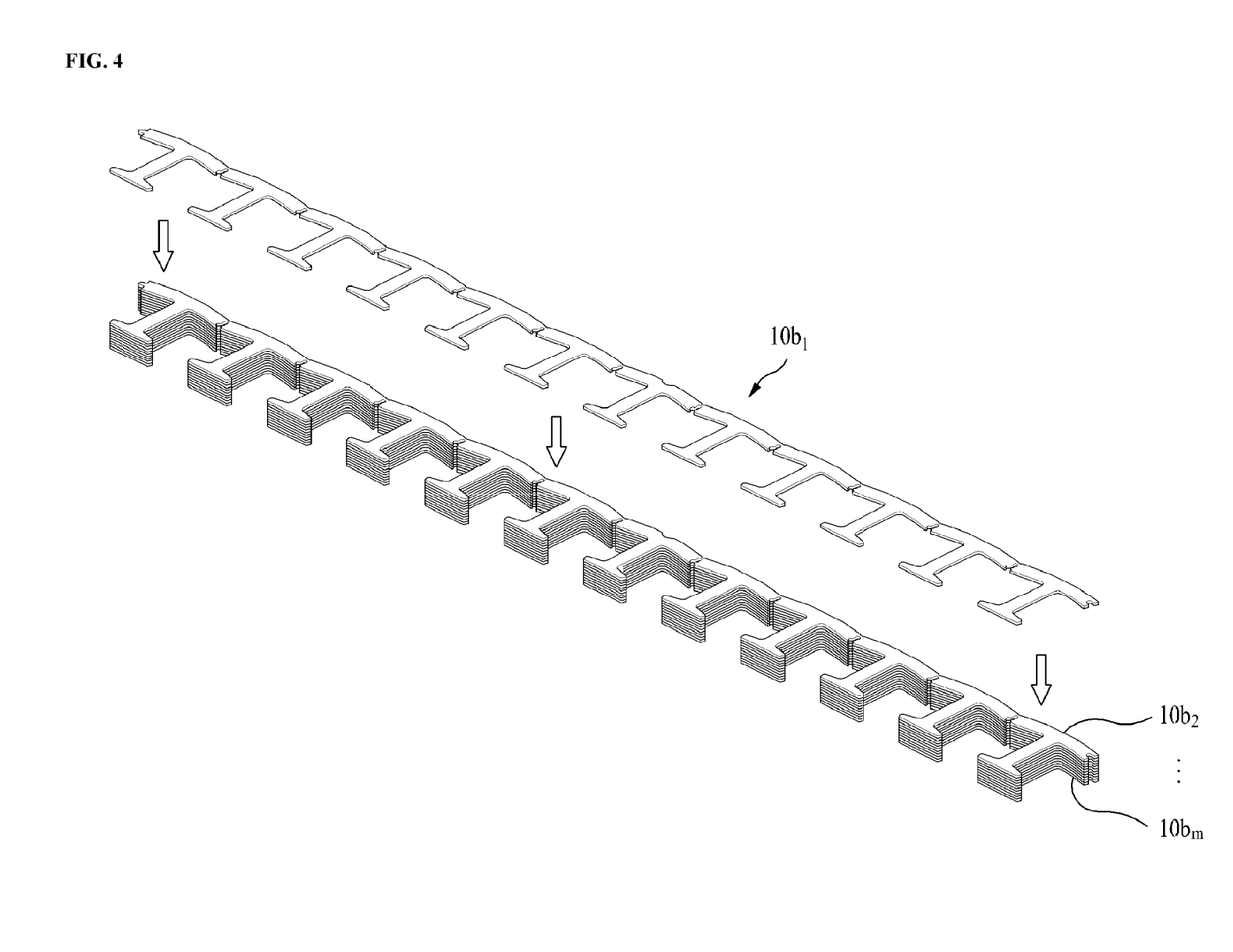
FIG. 4 is a perspective view showing a state where a plurality of sheets of the core stamped are laminated to manufacture the laminated core for motor according to the preferred embodiment of the present invention.
Figure 5:
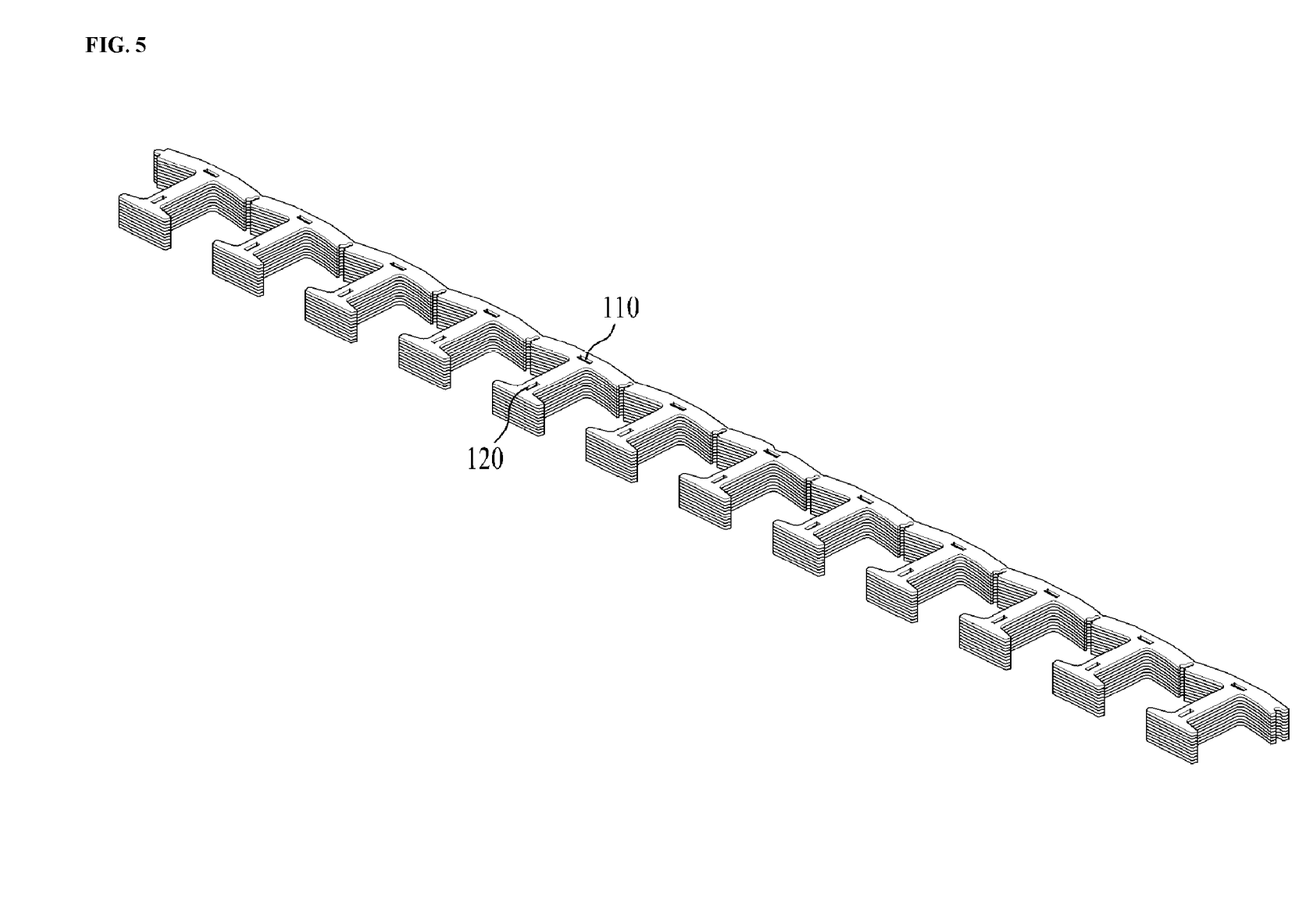
FIG. 5 is a perspective view showing a state where a caulking part is formed after the sheets of the core are laminated to manufacture the laminated core for motor according to the preferred embodiment of the present invention.
Figure 6:
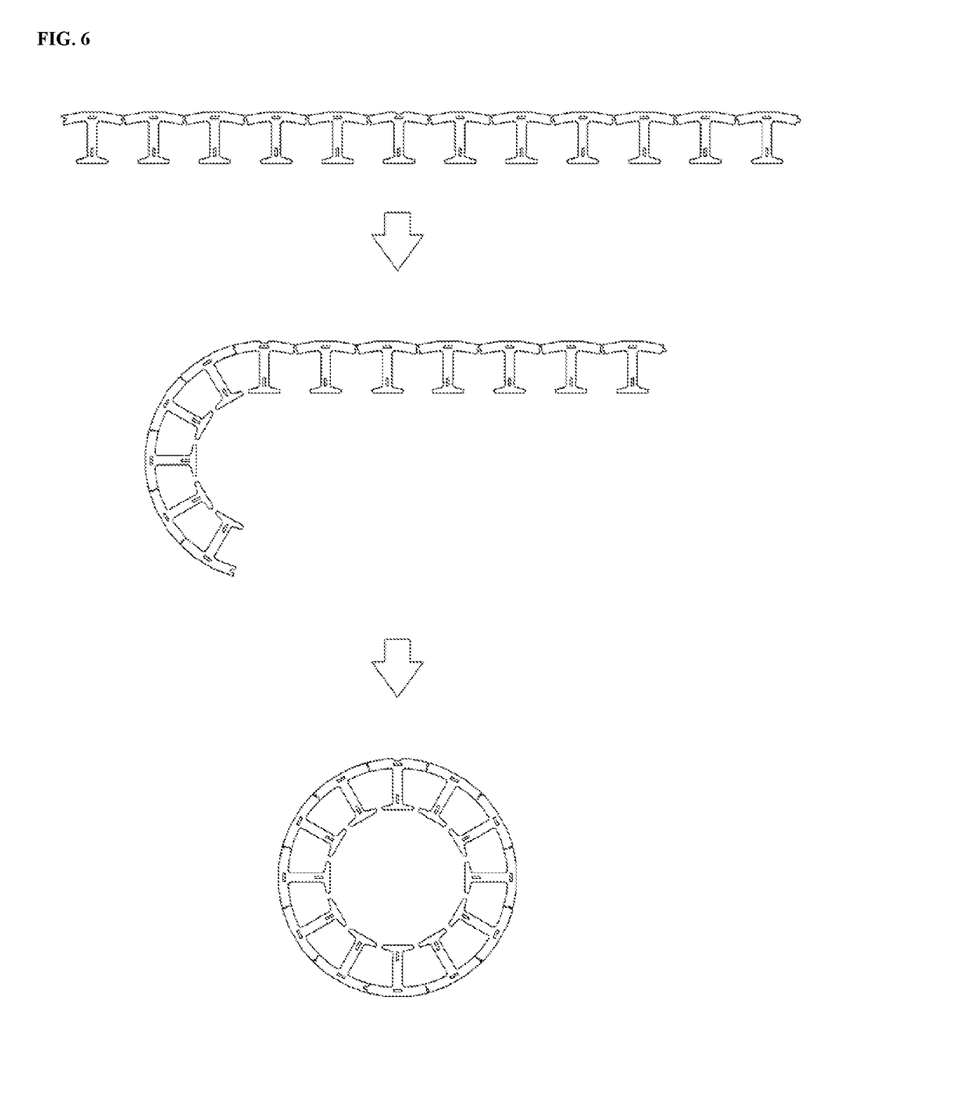
FIG. 6 is a plan view showing a process to make a round laminated core by bending the laminated core to manufacture the laminated core for motor according to the preferred embodiment of the present invention.

FIG. 4 shows a state where a plurality of sheets $10_{b1}$, $10_{b2}$, . . . , and $10_{bm}$ of the core stamped are laminated to manufacture the laminated core for motor according to the preferred embodiment of the present invention. As shown in FIG. 4, each of m sheets of the core is laminated perpendicularly. After that, as shown in FIG. 5, the caulking parts 110 and 120 are formed at the yoke part and the teeth part of each split core. FIG. 5 shows a state where the caulking parts 110 and 120 are formed after the sheets of the core are laminated to manufacture the laminated core for motor according to the preferred embodiment of the present invention. Of course, the caulking parts 110 and 120 may be formed whenever each sheet of the core is stacked up. After the caulking parts 110 and 120 are formed and all of the sheets of the core are stacked up, as shown in FIG. 6, the straight laminated core is bent to manufacture a round laminated core. FIG. 6 shows a process to make the round laminated core 10 by bending the laminated core to manufacture the laminated core for motor according to the preferred embodiment of the present invention.

Figure 7:
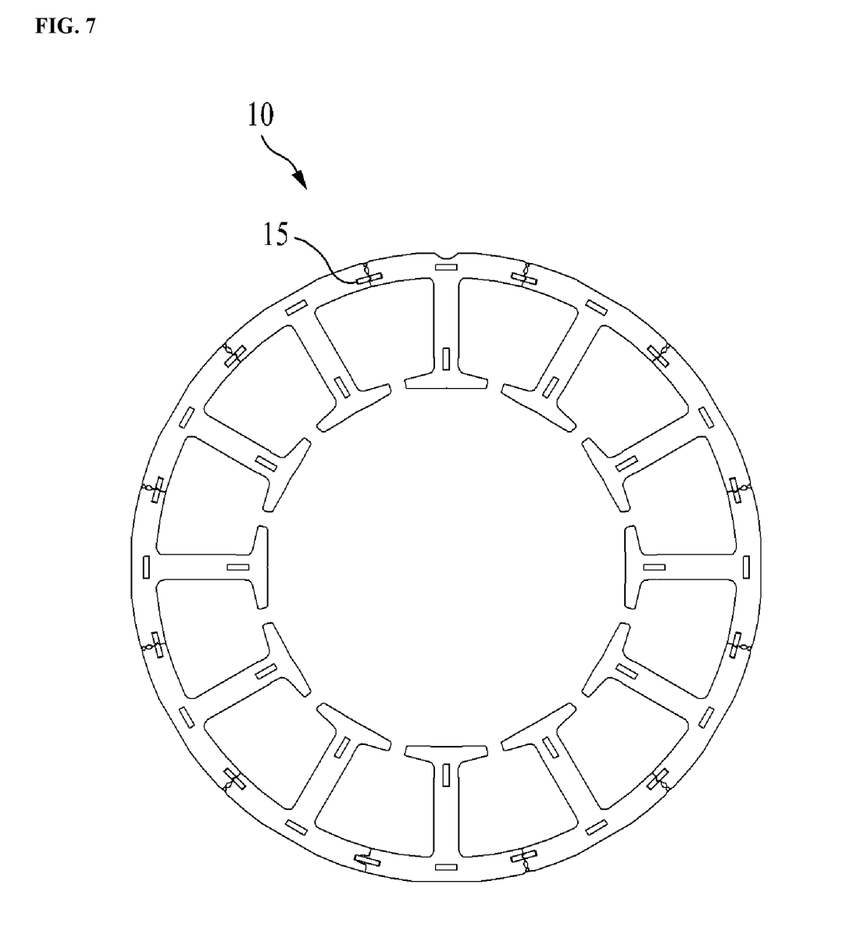
FIG. 7 is a plan view showing a state where a connection caulking part is formed on the round laminated core to manufacture the laminated core for motor according to the preferred embodiment of the present invention.

After that, the connection caulking part 15 is formed at the contact part 14 of each split core. Moreover, the connection caulking part 15 is also formed at the part where the connection protrusion 11a and the connection groove 11b formed at the contact parts of the first split core and the last split core are connected with each other. FIG. 7 shows a state where the connection caulking part 15 is formed on the round laminated core to manufacture the laminated core for motor according to the preferred embodiment of the present invention.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A method for manufacturing a laminated core for a motor comprising the steps of:

stamping a sheet of a core of a straight form to have a form that a plurality of split cores including yoke parts and teeth parts are connected, the yoke parts including a first yoke part, a plurality of second yoke parts, and a third yoke part each connected in series by a connection part;

laminating sheets of the core perpendicularly;

bending the sheets of the core in a round circular form;

coupling a contact protrusion formed on a first side of the first yoke part and each of the second yoke parts to a contact groove formed on a second side of each of the second yoke parts and the third yoke part;

coupling a connection protrusion formed on a first side of the third yoke part to a connection groove formed on a second side of the first yoke part;

forming a first connection caulking part crossing the contact protrusion and the contact groove which are coupled to each other; and forming a second connection caulking part crossing the connection groove and the connection protrusion which are coupled to each other.

* * * * *